United States Patent
Rieckmann

(10) Patent No.: US 7,414,530 B2
(45) Date of Patent: Aug. 19, 2008

(54) MONITORING CIRCUIT FOR A DOOR

(75) Inventor: Norbert Rieckmann, Hamburg (DE)

(73) Assignee: Airbus Deutschland GmbH (DE)

( * ) Notice: Subject to any disclaimer, the term of this patent is extended or adjusted under 35 U.S.C. 154(b) by 256 days.

(21) Appl. No.: 11/201,360

(22) Filed: Aug. 10, 2005

(65) Prior Publication Data

US 2006/0033489 A1 Feb. 16, 2006

Related U.S. Application Data

(60) Provisional application No. 60/601,388, filed on Aug. 13, 2004.

(30) Foreign Application Priority Data

Aug. 13, 2004 (DE) ........................ 10 2004 039 389

(51) Int. Cl.
*G08B 13/08* (2006.01)

(52) U.S. Cl. .................... 340/545.1; 340/551; 340/552; 340/945; 340/547

(58) Field of Classification Search ............... 340/545.1, 340/551, 552, 945, 545.4, 562, 561
See application file for complete search history.

(56) References Cited

U.S. PATENT DOCUMENTS

| 3,201,774 | A | * | 8/1965 | Uemura | 340/561 |
| 3,573,817 | A | * | 4/1971 | Akers | 340/522 |
| 4,219,740 | A | * | 8/1980 | Little | 307/116 |
| 4,513,257 | A | | 4/1985 | Miyamoto et al. | 331/65 |
| 4,914,388 | A | * | 4/1990 | Kalista et al. | 324/207.16 |
| 5,237,779 | A | * | 8/1993 | Ota | 451/5 |
| 5,264,783 | A | * | 11/1993 | Vig et al. | 323/294 |
| 5,428,253 | A | * | 6/1995 | Ogata et al. | 307/116 |
| 5,952,822 | A | * | 9/1999 | Kayserman et al. | 324/207.12 |
| 5,986,549 | A | * | 11/1999 | Teodorescu | 340/561 |
| 6,067,026 | A | * | 5/2000 | Weimer et al. | 340/686.6 |
| 6,518,776 | B2 | * | 2/2003 | Charneau et al. | 324/662 |
| 7,002,471 | B2 | * | 2/2006 | Geddes et al. | 340/539.23 |
| 7,207,142 | B2 | * | 4/2007 | Mullet | 49/199 |

FOREIGN PATENT DOCUMENTS

| DE | 2727525 A1 | 1/1979 |
| DE | 43 13 084 | 11/1994 |
| JP | 62160817 | 7/1987 |
| WO | WO 89/03537 | 4/1989 |

OTHER PUBLICATIONS

Extended European Search Report. Nov. 7, 2007. 7 pages.

* cited by examiner

*Primary Examiner*—George A Bugg
*Assistant Examiner*—Son M Tang
(74) *Attorney, Agent, or Firm*—Ostrolenk, Faber, Gerb & Soffen, LLP

(57) ABSTRACT

The present application describes a monitoring circuit for an aircraft. The monitoring circuit comprises an inductive system, wherein the inductive system comprises a multitude of air core inductors and capacitors. Depending on the distance between a target and the inductive system the frequency response of the inductive system is changed. The change in the frequency response is detected and displayed in a display unit. The monitoring circuit can be used to improve door monitoring in an aircraft.

7 Claims, 6 Drawing Sheets

MONITORING CIRCUIT FOR A DOOR

REFERENCE TO RELATED APPLICATIONS

This application claims the benefit of the filing date of U.S. Provisional Patent Application No. 60/601,388 filed Aug. 13, 2004, the disclosure of which is hereby incorporated herein by reference and of the German Patent Application No. 10 2004 039 389.3 filed Aug. 13, 2004, the disclosure of which is hereby incorporated herein by reference.

FIELD OF THE INVENTION

The present invention relates to monitoring a door in an aircraft. In particular, the present invention relates to a circuit for monitoring the position of a target, for example of a door of an aircraft, as well as to a corresponding method.

BACKGROUND OF THE INVENTION

A multitude of doors are used in aircraft. There are external doors which allow access from the outside to the passenger compartment, and there are freight loading doors. Any unintendedly open door leads to problems as a result of a decrease in pressure in the cabin, and to damage of the aircraft structure as a result of torn-off doors.

To prevent any unintended opening of doors, said doors are kept in the closed position by means of an expensive locking mechanism. Before takeoff it must be ensured that all locking mechanisms are in the position "locked and secured". For this reason the current position of locking devices is monitored by proximity switches and is centrally evaluated and displayed.

Most of the time this type of proximity switch is designed as an inductance with a ferrite core, operated as a free-running oscillator. If a magnetic conductor (target), which can be affixed to the monitoring mechanics, approaches said proximity switch, the magnetic resistance of the arrangement changes, and so does the inductance, and thus the oscillator changes its oscillation behaviour so that a change in the position of the locking mechanisms of a door leaf can be recognised. The ferrite core inserted in the inductances is nowadays required to ensure adequate sensitivity and thus reliable detection of the open position of the door leaf. Ferrite cores are however heavy. This has a negative effect in the case of aircraft, where weight savings are very important.

SUMMARY OF THE INVENTION

According to an exemplary embodiment of the present invention, a monitoring circuit for monitoring the position of a target is provided. The monitoring circuit comprises an inductive system. The inductive system comprises a multitude of air core inductors and a multitude of capacitors. In this arrangement the inductive system is designed such that depending on the distance between the target and the inductive system a frequency response of the inductive system is changed.

According to an aspect of the present invention, the air core inductors do not comprise any ferrite cores or similar cores that would involve additional weight. The inductive system is for example designed such that it responds to magnetically conductive targets. This may make it possible to render the inductive system insensitive to disturbances that may originate from other objects that are not made from materials containing iron and that can be situated in proximity to the inductive system. Furthermore, economical iron sheeting can be used as a target. Depending on the distance between the target and the inductive system, a frequency response of the inductive system can change in amplitude and centre frequency. It may thus be possible to convert mapping of a spatial value, namely the distance between a target and the inductive system, to an electrically measurable and evaluatable value, namely the changed shape of a frequency response. For example, by affixing the target to the door leaf and by affixing the inductive system to the door frame, the distance between the target and the inductive system can correspond to the distance of an open door. It may thus become possible to change the distance into an electrically measurable value.

According to a further exemplary embodiment of the present invention, the monitoring circuit further comprises a saw-tooth generator and a voltage controlled oscillator. The saw-tooth generator and the voltage controlled oscillator constitute a sweep signal generator which cycles through a predetermined frequency spectrum. With this frequency spectrum the sweep signal generator can excite the inductive system.

The sweep signal generator may generate a voltage curve with a known frequency curve. The inductive system can be excited with this known frequency curve. However, the inductive system can influence the known frequency curve. This may give rise to a new frequency curve whose shape depends on the resonating characteristics of the inductive system. Since the distance between the target and the inductive system can change the resonating frequencies of the inductive system, the frequency curve can depend on the distance between the target and the inductive system. If a particular shape of the frequency response is detected, said shape can be used to deduce the distance between the target and the inductive system. It is thus, for example, possible to determine the position of a door.

According to a further exemplary embodiment of the present invention, the monitoring circuit further comprises an evaluation unit which is designed to differentiate between at least two frequencies.

The inductive system can influence a known frequency response, depending on a target position. Accordingly, new frequency responses can be present which can be typical for a particular target position. An evaluation unit which is in a position to differentiate between the amplitudes of frequency responses in the case of several frequencies can thus determine the position of a target.

According to a further exemplary embodiment of the present invention, a monitoring circuit is disclosed whose evaluation unit comprises a multitude of band filters, wherein the centre frequency of a first band filter corresponds to a first frequency, and wherein a threshold value of the first frequency corresponds to a lower frequency of the inductive system in a first target position. The first band filter is designed to allow a first signal with the first frequency to pass. The centre frequency of a second band filter corresponds to a second frequency which corresponds to a resonating frequency of the inductive system at a second target position. The second band filter is designed to allow a second signal with the second frequency to pass.

The filters only allow signals of defined frequencies to pass. Signals of other frequencies are essentially attenuated so that they can arrive at the output of the filter either in a weakened state or not at all. This means that only a small section of a frequency response, which section is centred on the centre frequency of the band filter, is allowed to pass without attenuation. The frequency responses of the inductive system can be influenced depending on the target position, and can thus be of various shapes, and can have different signal strengths at various frequencies. By filtering particular regions of the frequency response it becomes possible to isolate the interesting regions. The signals obtained during such filtering can be fed to downstream systems for further processing.

According to a further exemplary embodiment of the present invention, a monitoring circuit is stated whose evaluation unit furthermore comprises a multitude of comparators. The comparators can furnish output signals depending on the comparison between the first and the second signal.

The signals at the outputs of the band filters vary in signal strength. The signal strengths correspond to different voltages of the frequency responses at different target positions. Since a comparator is designed to compare different voltages, it can be determined which voltage is higher. It may thus be possible to provide signals at the outputs of the comparators, which signals correlate to the distance between the target and the air core inductors.

According to a further exemplary embodiment of the present invention, a monitoring circuit is stated which also comprises a display unit. In this arrangement the display unit comprises luminous indicators which can display different target positions.

It may thus be possible to visually display signal states which are for example present at the outputs of comparators. Different display patterns of the luminous indicators can correspond to different target positions. In this way it becomes possible to quickly acquire the position of a target, and thus, for example, detect when a door is being opened. For example, an operator who has to monitor the opening of a door might find it easier to monitor a display that corresponds to a door position, rather than, for example, to measure a frequency response.

According to a further exemplary embodiment of the present invention, the monitoring circuit further comprises an alarm unit, wherein the alarm unit issues an alarm if the target is at a defined position.

According to an aspect, an alarm can thus be triggered if a defined target position has been reached. This can for example occur if a door reaches a defined opening position. It might be important that such a situation is detected so that if applicable the door can be closed again in time. Triggering an alarm at a defined position can obviate the need to permanently monitor a display or a signal curve.

According to a further exemplary embodiment of the present invention, a monitoring circuit is stated which is designed to monitor an opening state of the door of a cargo hold of an aircraft.

In the case of aircraft designed to transport goods it can be necessary to monitor a door. The use of a monitoring circuit according to the present invention may provide a fast overview of the opening position of a door.

According to a further exemplary embodiment of the present invention, a method for monitoring a position of a target is provided. To this effect, a multitude of air core inductors and a multitude of capacitors is provided. The target is made to approach the air core inductors in such a way that the frequency response of the inductive system changes. This change in the frequency response can be evaluated for monitoring the door.

This method may be used to monitor, for example, the opening of a door, so that possibly remedial action can be taken in time when the door opens unintendedly.

The application of the sensor is not limited to aircraft doors; it can for example also be in service in other vehicles or in immobile objects.

BRIEF DESCRIPTION OF THE DRAWINGS

Below, the embodiments of the present invention are described in detail with reference to the following figures.

DESCRIPTION OF PREFERRED EMBODIMENTS OF THE INVENTION

Figure 1:
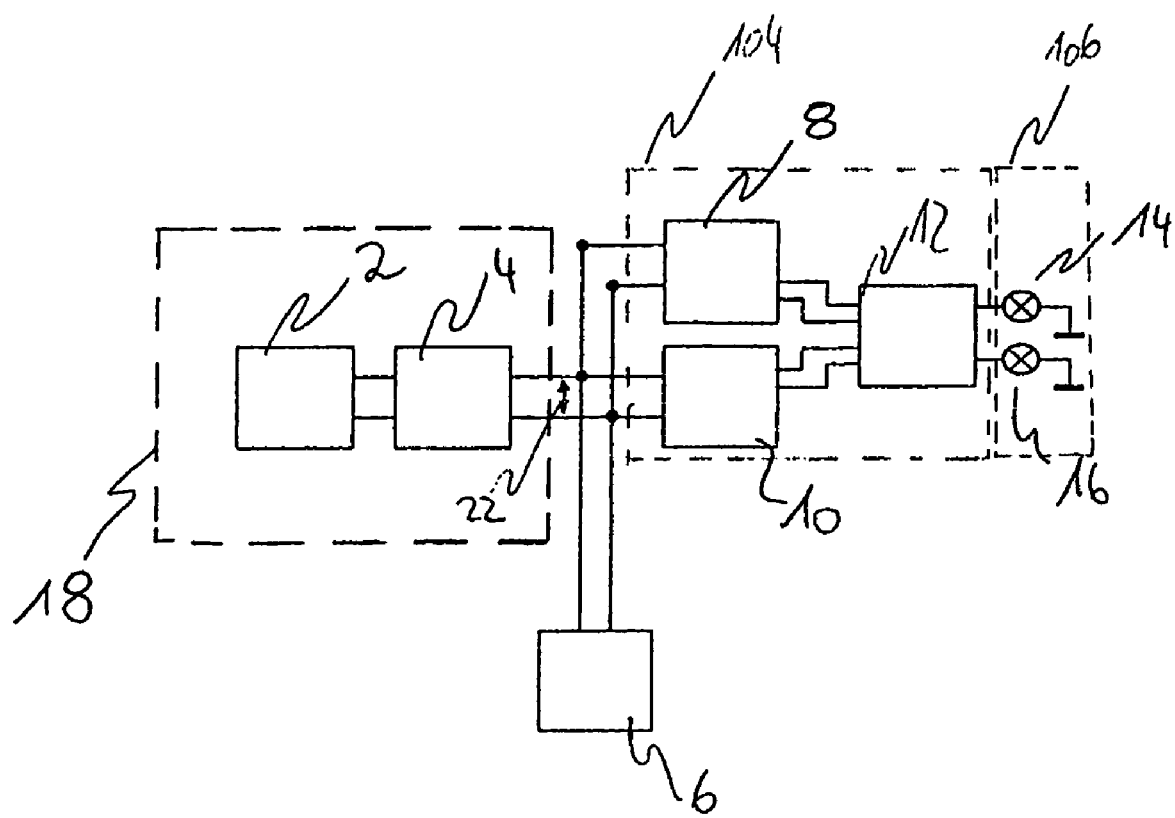
FIG. 1 shows a block diagram of a door monitoring circuit according to an exemplary embodiment of the present invention.

FIG. 1 shows a block diagram of a door monitoring circuit according to one embodiment of the present invention. The diagram shows four large functional blocks that are interconnected. These blocks are the sweep generator 18, the inductive system 6, the evaluation unit 104, and the display unit 106. The sweep generator 18, which comprises the saw-tooth generator 2 and the voltage controlled oscillator (VCO) 4, is used to excite the system. The evaluation unit 104 comprises a band filter 8 with centre frequency 38 (f1), a band filter 10 with centre frequency 40 (f2) and a comparator 12. The display unit comprises the luminous indicators 14 and 16.

The saw-tooth generator 2 generates a saw-tooth shaped voltage with which said saw-tooth generator 2 drives the VCO 4, after which said VCO 4 cycles through a predetermined frequency spectrum and generates voltages 22 of the corresponding frequencies. This frequency spectrum is switched to the inductive system 6. The inductive system 6 changes the frequency spectrum offered by the VCO 4 depending on the distance between a target 20 and the inductive system 6. The inductive system 6 thus acts as a sensor that senses the distance between the target and the inductive system 6. The inductive system 6 is connected in parallel to the output of the VCO 4 and to the inputs of the band filters 8 and 10. Thus the voltages at the output of the VCO 4 and at the inputs of the band filters 8 and 10 are the same. The band filters 8 and 10 together with the comparator 12 constitute the evaluation unit 104. Each of the band filters 8, 10 only allows a certain frequency spectrum of the input voltage 22 to pass. Band filter 8 is preset to a first frequency 38 (f1) while band filter 10 is preset to a second frequency 40 (f2). If the frequency of the input signal is near the frequency 38 (f1), a signal is present at the output of the band filter 8. If the frequency of the input signal is near the frequency 40 (f2), an output signal is present at the band filter 10. The comparator 12 compares the output signals of the band filters 8, 10, and depending on the ratio of the output signals said comparator 12 switches on either control-light unit 14 or control-light unit 16. The corresponding control-light unit 14, 16 can thus be used to display a detected frequency response. Since the frequency response depends on the distance between a target and the inductive system, the control-light unit 14 or 16 can indicate the position of a target. If the target 20 is connected to the leaf of a door, and the inductive system 6 is connected to the door frame, then this arrangement can be used for monitoring the opening of a door.

Since the frequencies used can vary within a wide range, the chance of other systems being influenced can be minimised. Examples of such systems include power supply on the ground at 50 Hz, on-board power supply at 400 Hz or data lines at 12.5 Hz. Because of the variability of the frequencies within a wide range, the monitoring system can be designed such that it operates far removed from any interfering frequencies of other systems. Furthermore, due to the variability of the frequencies the selection of components can be simplified. There is no need to use expensive special designs or precision components for fixed frequencies.

Figure 2:
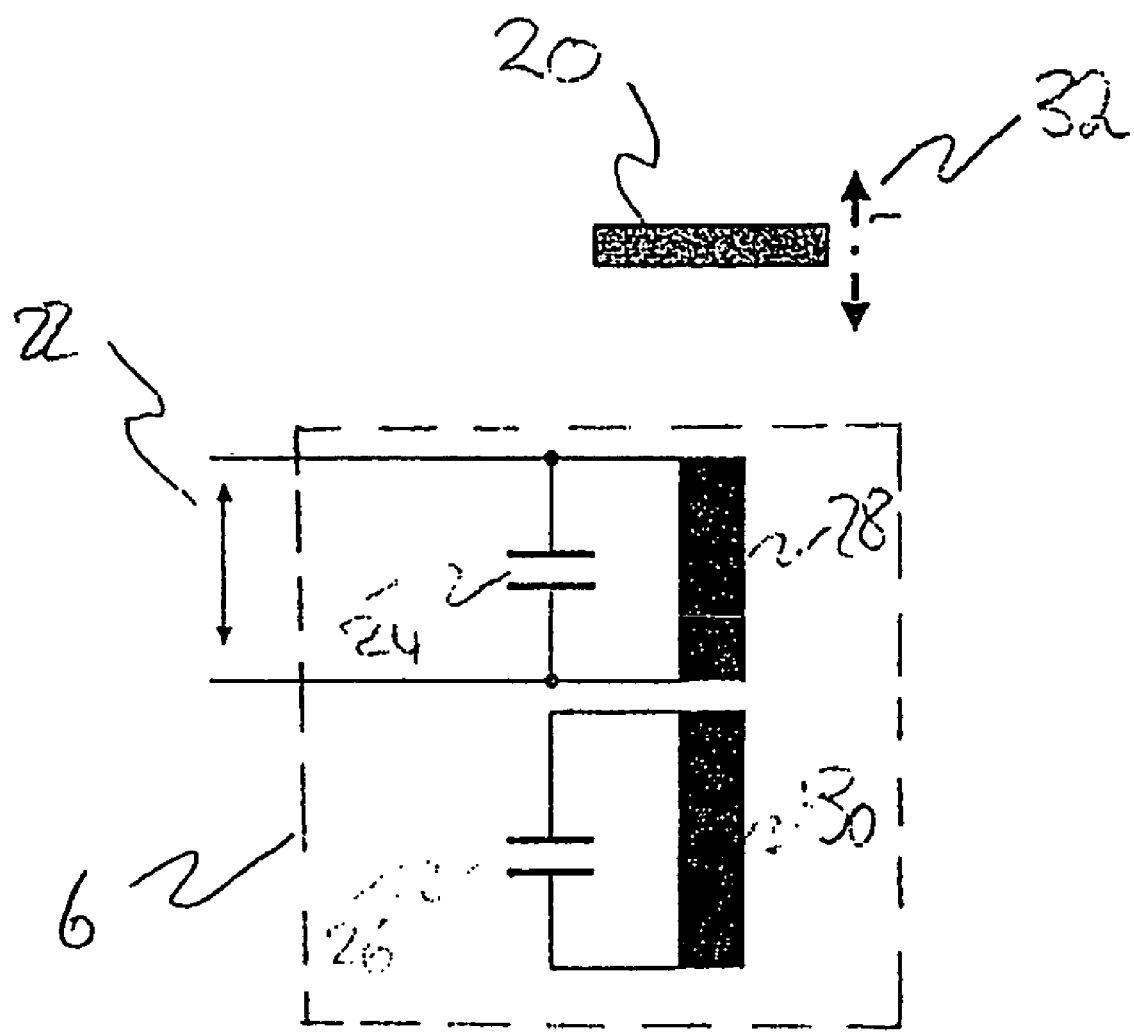
FIG. 2 shows a detailed block diagram of the inductive system according to an exemplary embodiment of the present invention.

FIG. 2 shows a detailed block diagram of the inductive system 6 according to one embodiment of the present invention. The diagram shows the design of the inductive system 6, which serves as a sensor for detecting the space between a target 20 and the inductive system 6. The sensor 6 comprises two resonant circuits formed by the air core inductors 28, 30 and by the capacitors 24, 26 that are connected in parallel to the air core inductors. For application in aircraft, the use of air core inductors 28, 30 may be advantageous because air core inductors do not require any inductor cores to amplify the magnetic fields. Such cores would entail additional weight and would act counter to a basic endeavour in aircraft engineering, namely to save as much weight as possible. The target 20 is a magnetically conductive conductor or a conductor containing iron, which conductor can be made from economical iron sheeting, e.g. ST 37.

At the sensor input the voltage 22 is present which is generated by the sweep generator 18 and which is also present in parallel at the band filters 8 and 10. The capacitor 24 and the air core inductor 28 form a first resonant circuit, while the capacitor 26 and the air core inductor 30 form a second resonant circuit. The first and the second resonant circuits are not interconnected by way of lines. Magnetic coupling can only take place if the air core inductor 28 induces a magnetic field in the air core inductor 30. The first resonant circuit has a resonating frequency of $f_{01}$ while the second resonant circuit has a resonating frequency of $f_{02}$, wherein $f_{01}$ is half the magnitude of $f_{02}$. The capacities of the two capacitors 24 and 26 are the same, while the inductor 30 has a value of 1.4 times the value of inductor 28. By varying the magnitude ratios of the inductors 30 and 28, the distance between $f_{01}$ and $f_{02}$ can be changed.

If the target 20 is at a far distance from the inductive system 6 in the direction 32, the sensor voltage 22 faces an input resistance which is predominantly caused by the capacitor 24 and the inductor 28. This input resistance has an influence on the frequency response of the voltage 22. Since temperature influences have the same effect on the capacities, with this arrangement temperature influences on capacities can be compensated for. When the target 20 approaches the inductive system, there is an increase in the coupling between the first resonant circuit, comprising capacitor 24 and air core inductor 28, and the second resonant circuit, comprising capacitor 26 and air core inductor 30. As a result of this, the resistance which is faced by the voltage 22 changes, and thus the associated frequency response changes. The first resonant circuit is attenuated more strongly by the stronger coupling of the resonant circuits; with its bandwidth being increased and also shifted. This behaviour is explained in more detail in FIG. 4.

Figure 3:
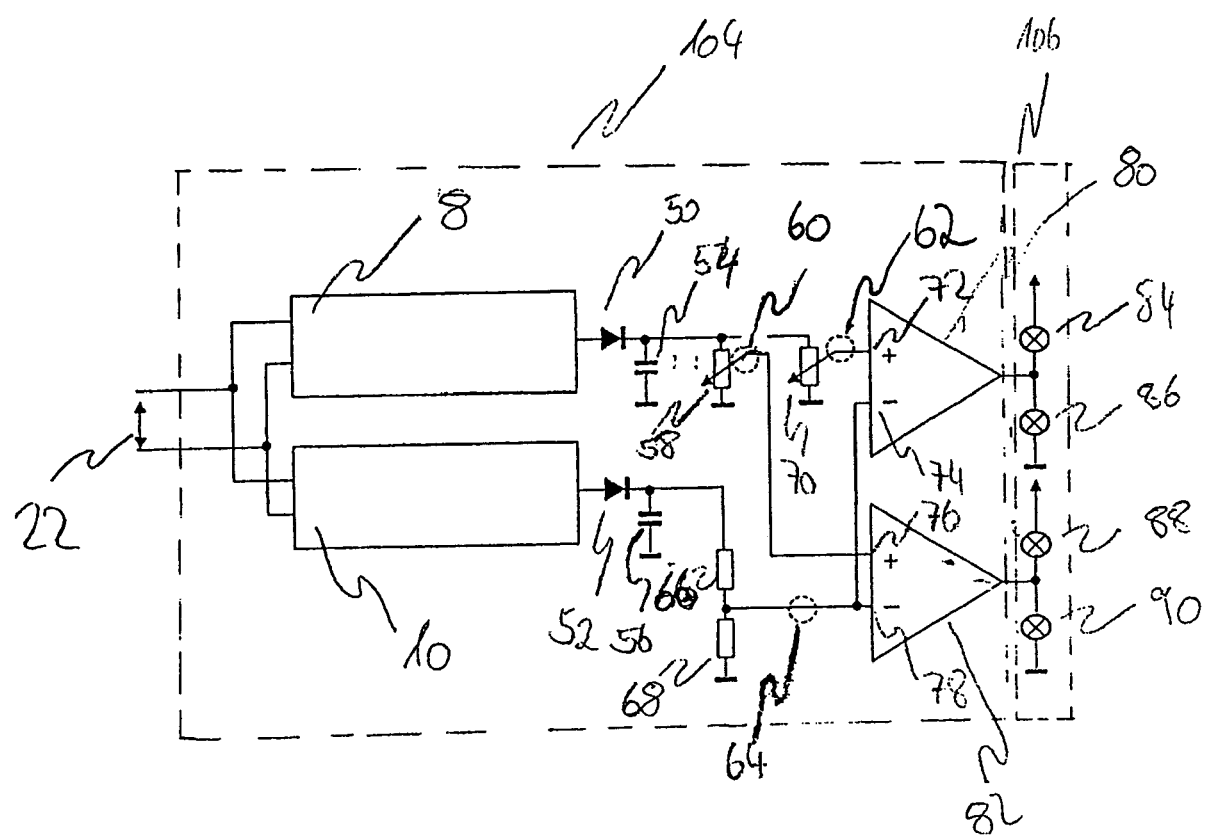
FIG. 3 shows a detailed block diagram of an evaluation unit and display unit according to an exemplary embodiment of the present invention.

FIG. 3 shows a detailed block diagram of an evaluation unit and a display unit according to one embodiment of the present invention. The evaluation unit 104 comprises the band filter 8 with the centre frequency 38 (f1) and the band filter 10 with the centre frequency 40 (f2). These band filters allow signals to pass only near their centre frequency and are thus selective to the frequency response. At their outputs the anodes of diodes 50 and 52 are connected, while at the cathodes of the diodes the capacitors 54 and 56 are connected to mass. Diode 50 and capacitor 54 are used to smooth and rectify the output signal of the band filter 8, while diode 52 and capacitor 56 are used to smooth and rectify the output signal of band filter 10. Following smoothing, the output signal of the band filter 8 is supplied to potentiometers 58 and 70, by means of which potentiometers switching thresholds for the comparators 80 and 82 can be set. The output signal 60 picked up at potentiometer 58 is present at the positive input of comparator 82. The voltage 62 picked up at potentiometer 70 is present at the positive input 72 of the comparator 80. The smoothed and rectified output signal of the band filter 10 is fed into a voltage divider which comprises resistors 66 and 68. The voltage 64, which by means of the voltage divider comprising resistors 66 and 68 is set to a value that is comparable to the output signals of the band filter 8, is fed to the negative inputs 74 and 78 of the comparators 80 and 82. In this way the outputs of the band filters 8 and 10 can be compared with each other, and thus signal strengths of a defined frequency can be determined. By changing the potentiometers 58 and 70, various switching thresholds can be set. Because the frequency responses and thus the signal strength at the outputs of the band filters 8 and 10 depend on the distance between the target 20 and the inductive system 6, the switching thresholds correspond to various target distances. The outputs of the comparators 80 and 82, and thus the outputs of the evaluation unit 104, are connected to the display unit 106. The output of the comparator 80 is connected to the control-light units 84 and 86, while the output of the comparator 82 is connected to the control-light units 88 and 90. At the positive inputs 72 and 76 of the comparators 80 and 82 a direct voltage signal is present which corresponds to the amplitude at the centre frequency of the first band filter 8. At the negative inputs 74 and 78 of the comparators 80 and 82 a direct voltage signal is present which corresponds to the amplitude of the voltage 22 at the centre frequency of the band filter 10. If the signal at the positive input 72 of the comparator 80 is greater than the signal at the negative input 74 of the comparator 80, the output of the comparator 80 is also positive. Consequently the control-light unit 86 lights up, while the control-light unit 84 remains dark. The control-light unit 84 corresponds to a position "Far 1", while control-light unit 86 corresponds to the position "Near 1". If the signal at the negative input 74 of the comparator 80 is more positive than the signal at the positive input 72, then the output of the comparator 80 is negative. Consequently the control-light unit 84 lights up, while the control-light unit 86 remains dark. If on the comparator 82 the positive entry 76 is more positive in comparison to the negative input 78, then the output of the comparator 82 has a positive value. Consequently the control-light unit 90 lights up, while the control-light unit 88 remains dark. The control-light unit 88 corresponds to the position designated "Far 2", while the control-light unit 90 corresponds to the position and the designation "Near 2". If the value of the negative input 78 of the comparator 82 is more positive when compared to the positive input 76, then the output of the comparator 82 has a negative value. Consequently the control-light unit 88 lights up, while the control-light unit 90 remains dark. Because the frequency response of the voltage 22 depends on the target position of target 22 in relation to the inductive system 6, by means of display unit 106 it is thus possible to achieve a display of the control-light units 84, 86, 88 and 90. Calibration as to which of the control-light units "Far 1", "Near 1", "Far 2" or "Near 2" lights up at what target position can be undertaken by selecting the potentiometers 58 and 70 and the voltage divider comprising the resistors 66 and 68. Because only the voltage differences are examined, the circuit is to a very large extent independent of any fluctuations in the supply voltage. Since the number of discrete components required is small, the circuit can essentially be implemented with two standard ICs, e.g. LM 324 and LM 556.

Figure 4:
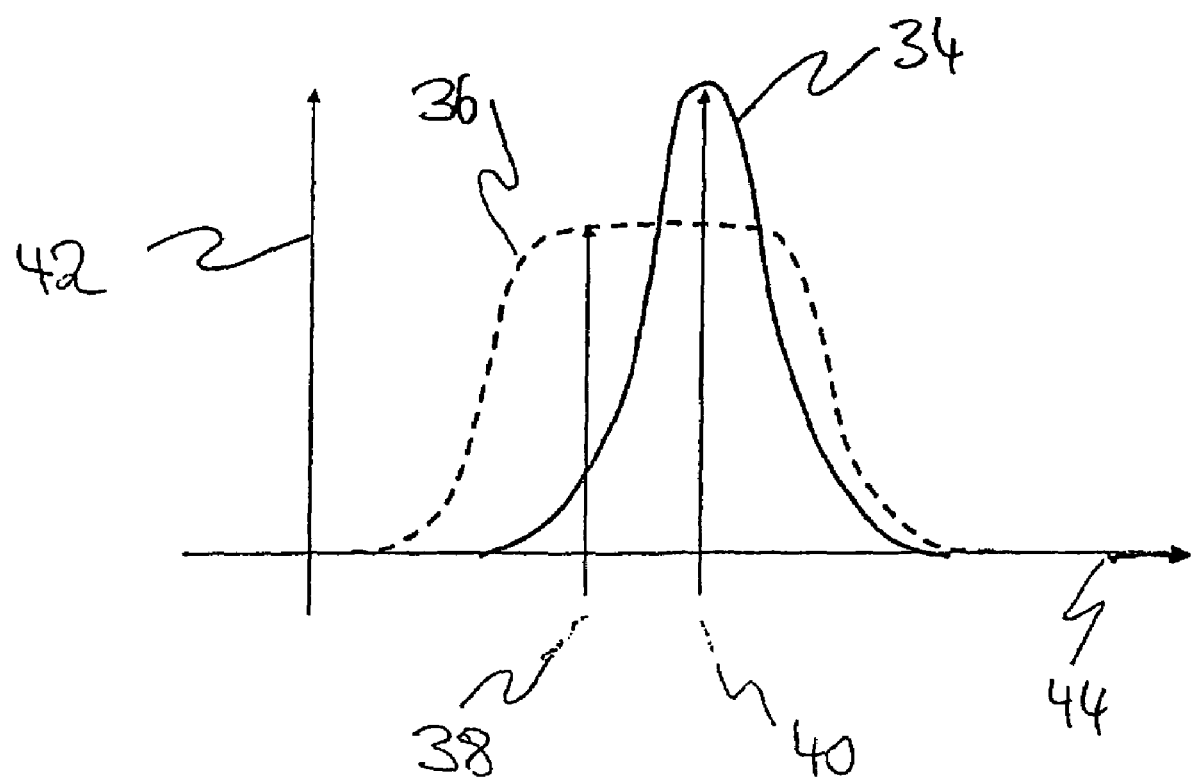
FIG. 4 shows frequency responses of the inductive system at various target positions according to an exemplary embodiment of the present invention.

FIG. 4 shows frequency responses of the inductive system at various target positions according to one embodiment of the present invention. The diagram shows a coordinate system whose abscissa 44 shows the frequency, and whose ordinate 42 shows the voltage of the signal 22. The two frequency responses 34 and 36 are entered into the coordinate system. Frequency response 34 results when the target 20 is far from the inductive system 6 so that only the capacitor 24 and the air core inductor 28 have an effect on the input voltage 22. The resonating frequency of the frequency response 34 corresponds to the resonating frequency of the first resonant circuit, which comprises capacitors 24 and 28. When the target 20 approaches the inductive system 6, the resonant circuit is attenuated, and consequently the amplitude is reduced. At the same time the bandwidth increases, and the centre frequency is near the resonating frequency of the resonant circuit, which comprises the capacitor 26 and the air core inductor 30. Curve 36 shows the resulting frequency response of signal 22 with a target that has approached. The frequencies of band filters 8, 10 are also shown in the diagram. The centre frequency 40 of band filter 10 corresponds to the resonating frequency ($f_{01}$) of the curve 34. The centre frequency of the band filter 8 appears as no. 38 in FIG. 4. The centre frequency 38 of the filter 8 is near the lower cut-off frequency of the frequency response 36 when the distance to the target 20 is shortest.

Figure 5:
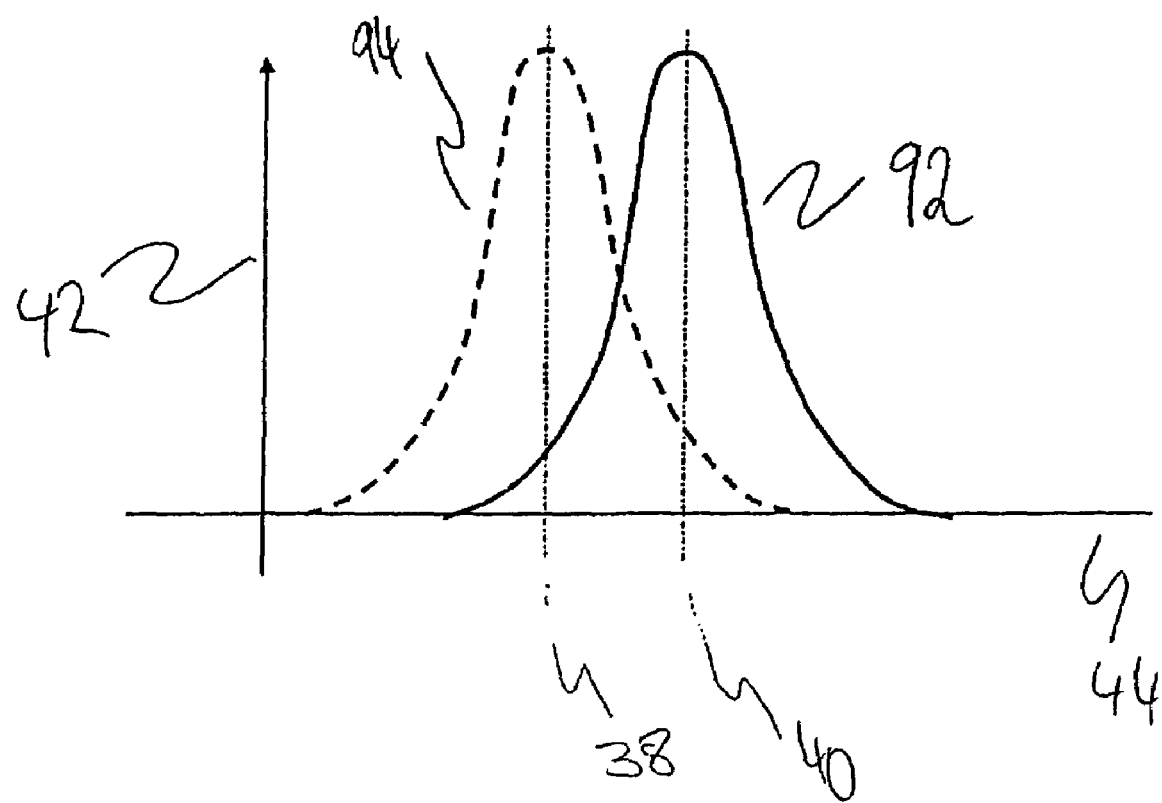
FIG. 5 shows filter pass curves of two band-pass filters according to an exemplary embodiment of the present invention.

FIG. 5 shows filter pass curves of two band-pass filters 8, 10 according to one embodiment of the present invention. Ordinate 44 in the diagram shows the frequency, and abscissa 42 shows the voltage which is allowed to pass by the filters 8, 10 at defined frequencies. The gradient of the filter pass curve 92 of the band-pass filter 10 has a centre frequency 40. The frequency curve 94 corresponds to the filter pass curve of the band filter 8 and has a centre frequency 38. The two filter pass curves 92 and 94 intersect, which is why it is not possible to precisely separate the frequencies. Consequently, in the case of signals of the frequency 40 an output signal results both at the output of the filter 10 and at the output of the band-pass filter 8. However, at frequency 40 the signal at the output of the band-pass filter 8 is considerably attenuated when compared to the signal at the output of band-pass filter 10. Likewise, in the case of signals of frequency 38, activities occur at the output of the band-pass filters 8 and 10, wherein the output signal of the band-pass filter 10 is considerably attenuated when compared to the output signal of band-pass filter 8.

Figure 6:
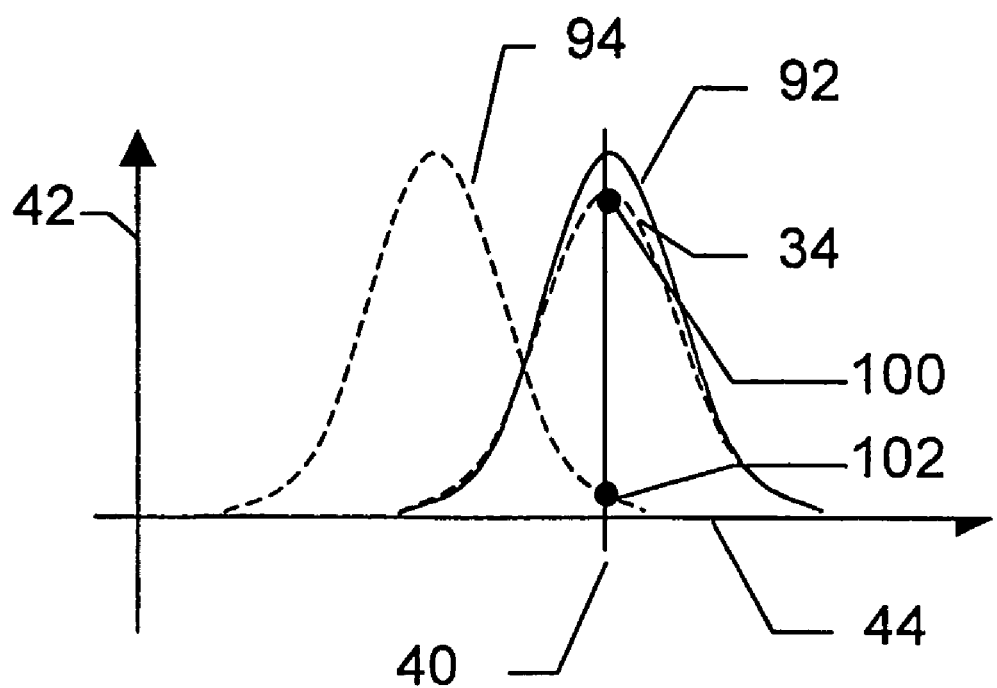
FIG. 6 shows a frequency response of the inductive system in the case of a far target together with the filter pass curves according to an exemplary embodiment of the present invention.

FIG. 6 shows a frequency response of the inductive system 6 in the case of a far target together with the filter pass curves 92, 94 according to one embodiment of the present invention. In the coordinate system of FIG. 6 abscissa 44 shows the frequency, and ordinate 42 shows the voltage of the frequency response or the filter pass curves. The frequency pass curves 92 and 94 have been explained in FIG. 5. If the target 20 is at a very large distance from the inductive system 6, the frequency response of the inductive system 6, and thus the input voltage 22 at the comparators 8 and 10 essentially correspond to curve 34. The resonating frequency ($f_{01}$) of the curve 34 coincides with the centre frequency 40 of the band filter 10.

The sweep generator 18 repeatedly cycles through the frequency spectrum and in this way excites the inductive system. Because of its resonance characteristics the inductive system 6 changes the frequency response of the signal 22 generated by the sweep generator 18 so that said frequency response essentially corresponds to the gradient of curve 34. The voltage gradient of curve 34 is present at the inputs of the band filters 8 and 10. Because of the different filter characteristics 92 and 94 of the band filters 10 and 8 the signal strengths at the outputs of the band filters 10, 8 differ. At a centre frequency 40 of the band filter 10 it attenuates the input signal least, while the input signal is very strongly attenuated by band filter 8. In FIG. 6 this is indicated by the points 100 and 102. In the diagram, point 100 corresponds to the output signal of the band filter 10 at the frequency 40, while point 102 corresponds to the output signal of the band filter 8 at this frequency 40. Therefore in this case the output signal of the band filter 10 will be more positive when compared to the output signal of the band filter 8, so that consequently the input signal on the negative inputs 78 and 74 of the comparators 82 and 80 is more positive when compared to the input signal 62 of the positive input 72 of the comparator 80 and of the input signal 60 of the positive input 76 of the comparator 82. Therefore a negative output signal arises both at the output of the comparator 80 and at the output of the comparator 82. Consequently the two control-light units 84 ("Far 1") and 88 ("Far 2") light up, thus signalling the far target position.

Figure 7:
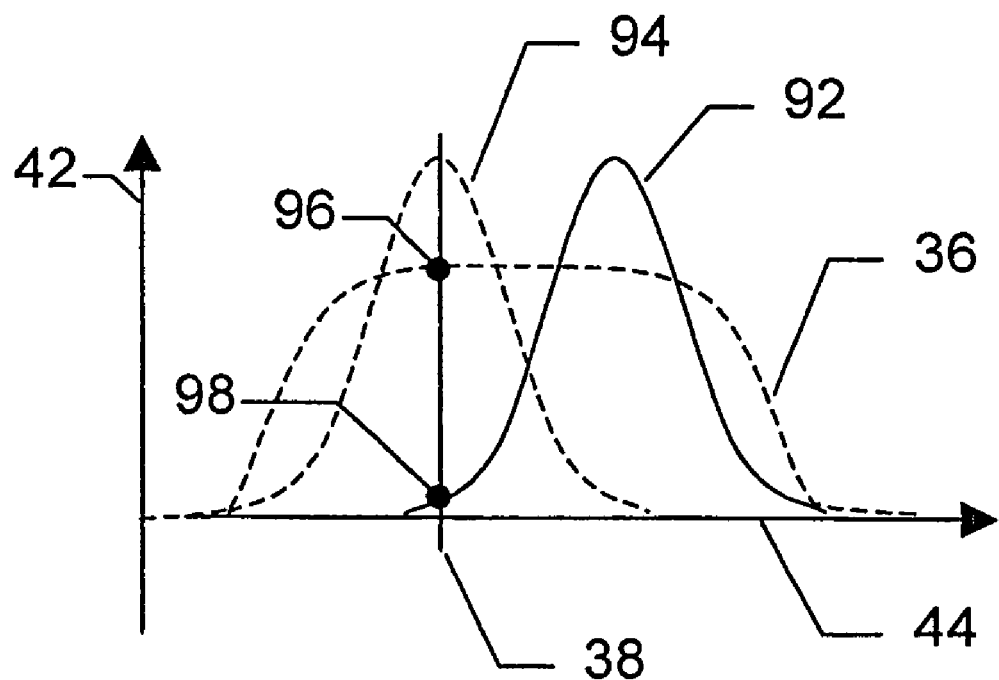
FIG. 7 shows a frequency response of the inductive system in the case of a near target together with the filter pass curves according to an exemplary embodiment of the present invention.

FIG. 7 shows a frequency response of the inductive system 6 in the case of near target positions together with the filter pass curves 92, 94 according to one embodiment of the present invention. The diagram shows a coordinate system in which abscissa 44 shows the frequency, and ordinate 42 shows the voltage. The filter pass curves 92 and 94 are known from FIG. 5. In a near target position, coupling occurs between the first resonant circuit, comprising capacitor 24 and air core inductor 28, and the second resonant circuit, comprising capacitor 26 and air core inductor 30. Consequently the frequency response corresponds to the voltage 22 of curve 36. The centre frequency 38 of the band filter 8 is close to the lower cut-off frequency of the frequency response 36. With a centre frequency 38 of the band-pass filter 8 the band-pass filter 8 allows a signal 22 that is present to pass almost without attenuation, while the band-pass filter 10 attenuates the signal to a very large extent. FIG. 7 indicates the output signals of the band-pass filters 8 and 10 at frequency 38 by points 96 and 98. The diagram shows that the output signal 96 of filter 8 is more positive than the output signal 98 of the band-pass filter 10. In this way both the input signal 62 at the positive input 72 of the comparator 80 and the input signal 60 at the positive input 76 of the comparator 82 are more positive when compared to the input signal 64 of the negative input 74 of the comparator 80 and of the negative input 78 of the comparator 82. This results in a positive output signal both at the comparator 80 and at the comparator 82. These positive output signals cause the control-light unit 86 and the control-light unit 90, which correspond to the two positions "Near 1" and "Near 2", to light up. In this way a situation is achieved wherein the near target position is displayed by the light signals.

By means of potentiometers 58 and 70, various switching thresholds can be set. It is thus possible to differentiate between still further target distances. These further target distances would be located between the two extreme positions of "Target far" and "Target very near".

According to an exemplary embodiment of the present invention a method for monitoring a door is stated. First a target 20 is positioned in relation to an inductive system 6. The target 20 is arranged on the element whose position is to be monitored, while the inductive system 6 is arranged so as to be stationary. The inductive system 6 comprises a multitude of air core inductors 28, 30 and capacitors 24, 26. If the door is opened or closed, the distance between the target 20 and the inductive system 6 changes. Correspondingly a frequency response 34, 36 of the inductive system 6 changes. If the target 20 is far removed from the inductive system 6, the frequency response is as shown in curve 34, while at the minimum distance between the target and the inductive system 6 the frequency response is as shown in curve 36. The change in the frequency response is evaluated by means of an evaluation circuit 104. In this way the position of the target and thus unlocking and opening of the door is detected, and finally this position is displayed by a display unit 106.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

What is claimed is:

1. A monitoring circuit for monitoring a position of a target, comprising:
   an inductive system having
   a plurality of air core inductors
   and a plurality of capacitors,
   the inductive system being operable to change its frequency response depending on a distance between the target and the inductive system; and
   an evaluation unit having a plurality of band filters, a center frequency of a first band filter corresponding to a first frequency and a center frequency of a second band filter corresponding to a second frequency, a threshold value of the first frequency corresponding to a lower frequency of the inductive system at a first target position, the second frequency corresponding to a resonating frequency of the inductive system at a second target position, the first band filter being operable to allow through a first signal having the first frequency and the second band filter being operable to allow through a second signal having the second frequency, wherein the monitoring circuit monitors an opened state and a closed stated of a door of an aircraft constituting said target.

2. The monitoring circuit of claim 1, further comprising:
   a saw-tooth generator;
   a voltage controlled oscillator;
   wherein the saw-tooth generator and the voltage controlled oscillator constitute a sweep signal generator which cycles through a predetermined frequency spectrum;
   wherein the sweep signal generator excites the inductive system with the frequency spectrum.

3. The monitoring circuit of claim 1,
   wherein the evaluation unit is operable to differentiate between at least two frequencies.

4. The monitoring circuit of claim 1, wherein the evaluation unit further comprises:
   a plurality of comparators supplying output signals depending on a comparison between the first and the second signal.

5. The monitoring circuit of claim 1, further comprising:
   a display unit comprising luminous indicators displaying different target positions.

6. The monitoring circuit of claim 1, further comprising:
   an alarm unit;
   wherein the alarm unit issues an alarm at a predetermined target position.

7. A method of monitoring a position of a target, comprising the following steps:
   providing an inductive system with a plurality of air core inductors and a plurality of capacitors;
   making the target approach the air core inductors in such a way that a frequency response of the inductive system changes, wherein the monitoring monitors an opened state and a closed state of a door of an aircraft constituting said target; and
   evaluating the change in the frequency response for monitoring a door using an evaluation unit, the evaluation unit comprising a plurality of band filters, a center frequency of a first band filter corresponding to a first frequency and a center frequency of a second band filter corresponding to a second frequency, a threshold value of the first frequency corresponding to a lower frequency of the inductive system at a first target position, the second frequency corresponding to a resonating frequency of the inductive system at a second target position, the first band filter being operable to allow through a first signal having the first frequency and the second band filter being operable to allow through a second signal having the second frequency.

* * * * *